United States Patent
Bronoel et al.

(10) Patent No.: US 6,183,900 B1
(45) Date of Patent: Feb. 6, 2001

(54) ALKALINE STORAGE BATTERY WITH A NEGATIVE ZINC ELECTRODE

(75) Inventors: Guy Bronoel, Versailles; Noélle Tassin, Fontenay-sous-Bois; Alain Millot, Dammarie-les-Lys, all of (FR)

(73) Assignee: Laboratoires Sorapec, Fontenay-Sous-Bois (FR)

(*) Notice: Under 35 U.S.C. 154(b), the term of this patent shall be extended for 0 days.

(21) Appl. No.: 09/145,291

(22) Filed: Sep. 2, 1998

Related U.S. Application Data

(63) Continuation of application No. PCT/FR97/00228, filed on Feb. 5, 1997.

(30) Foreign Application Priority Data

Mar. 8, 1996 (FR) .................................................. 96 02941

(51) Int. Cl.[7] .............................. H01M 2/12; H01M 2/14; H01M 2/16; H01M 6/24
(52) U.S. Cl. .......................... 429/72; 429/101; 429/142; 429/144; 429/145; 429/206; 429/229; 429/249; 429/254; 429/317
(58) Field of Search .................................. 429/101, 142, 429/144, 206, 207, 229, 249, 250, 72, 27, 29, 129, 145, 254, 317

(56) References Cited

U.S. PATENT DOCUMENTS

| | | | |
|---|---|---|---|
| 2,968,686 | * | 1/1961 | Duddy . |
| 2,994,625 | * | 8/1961 | Mendelsohn et al. . |
| 4,137,371 | * | 1/1979 | Blanchart et al. ............ 429/29 |
| 4,348,465 | * | 9/1982 | Struthers ...................... 429/27 |
| 4,592,973 | | 6/1986 | Pemsler et al. .............. 429/206 |
| 4,789,609 | | 12/1988 | Ambrose-Ritchey et al. ... 429/144 |
| 5,143,799 | | 9/1992 | Tsenter ........................ 429/9 |
| 5,196,276 | * | 3/1993 | Niksa et al. ................. 429/52 |

FOREIGN PATENT DOCUMENTS

| | | |
|---|---|---|
| 3907741 | 9/1990 | (DE) . |
| 0517921 | 12/1992 | (EP) . |
| 0584987 | 3/1994 | (EP) . |
| 1214394 | 4/1960 | (FR) . |
| 1230664 | 9/1960 | (FR) . |
| 2708382 | 2/1995 | (FR) . |
| 50-102832 | 8/1975 | (JP) . |
| 58-165243 | 9/1983 | (JP) . |
| 60-117568 | 6/1985 | (JP) . |
| 8504287 | 9/1985 | (WO) . |
| 9222936 | 12/1992 | (WO) . |

OTHER PUBLICATIONS

Patent Abstracts of Japan vol. 009, No. 274 (E–354), Oct. 31, 1985.
Patent Abstracts of Japan vol. 007, No. 288 (E–218), Dec. 22, 1983.
Database WPI Derwent Publications Ltd., London, GB; AN 77–34950Y XP002016609, Aug. 1975.

\* cited by examiner

*Primary Examiner*—Stephen Kalafut
*Assistant Examiner*—Jonathan Crepeau
(74) *Attorney, Agent, or Firm*—Henderson & Sturm LLP

(57) ABSTRACT

An alkaline storage battery comprising at least one positive electrode and a negative zinc electrode in contact with an electrolyte via at least one electrolyte-impregnated separator is disclosed. The electrodes are clamped against two respective bipolar screens supported by a sealing frame. The positive electrode is in contact with a first electrolyte having a predetermined volume and composition via at least one first separator, the negative electrode is in contact with a second electrolyte having a predetermined volume and composition different from those of the first electrolytes via at least one second separator, and the first and second electrolytes are separated by a membrane forming a zincate and optionally aluminate filter, particularly an anionically conductive membrane defining first and second compartments.

7 Claims, 2 Drawing Sheets

ALKALINE STORAGE BATTERY WITH A NEGATIVE ZINC ELECTRODE

This is a continuation of International Application No. PCT/FR97/00228, filed Feb. 5, 1997 entitled "ALKALINE STORAGE BATTERY WITH A NEGATIVE ZINC ELECTRODE" the disclosure of which in its entirety is hereby incorporated herein by reference.

This invention relates to an alkaline storage battery with a negative zinc electrode comprising a membrane separating two electrolytes of different volume and composition, in particular an ion-exchange membrane.

The following description relates to an Ni-Zn storage battery but it can just as well relate to an Ag-Zn storage battery, the Ni being replaced by the Ag, or to an Air-Zinc storage battery, etc.

Much work has been done in the last twenty years with a view to perfecting an Ni-Zn storage battery with a satisfactory longevity in cycling.

Of late, it has been admitted that the poor cycling strength of the Ni-Zn storage battery was due to short-circuits caused by the formation of zinc dendrites on charging.

Now, the dendrites have a greater tendency to form, the greater the concentration of zincates in the electrolyte in contact with the negative electrode.

The most effective remedies consist therefore in reducing the solubility of the zinc in the alkaline solutions, either by reducing its basicity, or by incorporating additives such as CaO in the active mass of the negative electrode in order to form insoluble complexes with the ionised forms of zinc.

Finally, the addition to the electrolyte of metallic ions such as $Pb^{4+}$ or compounds capable of acting on the morphology of the zinc deposits has also been noted.

By combining these various means, Cairns noted (J. Electrochem. Soc., 1993, 140, 2, pp 289–293) that the problem of the dendrites was resolved but that on the other hand the longevity in cycling, of the order of 500 cycles, although considerably increased in relation to the best results in the past (200 cycles), was limited by the deficiency of positive nickel electrodes.

Work done by the applicant has led to the same conclusion as Cairns.

The object of the present invention is to alleviate in particular the above-mentioned drawbacks.

To this end, the invention relates to an alkaline storage battery, comprising at least one positive electrode and a negative zinc electrode in contact with an electrolyte via at least one electrolyte-impregnated separator, clamped against two respective bipolar screens supported by a sealing frame.

According to the invention, the positive electrode is in contact with a first electrolyte having a predetermined volume and composition via at least one first separator in that the negative electrode is in contact with a second electrolyte having a predetermined volume and composition different from those of the first electrolyte via at least one second separator. The first and second electrolytes are separated by a membrane forming a zincate and optionally aluminate filter, particular an anionically conductive membrane defining first and second compartments.

According to a characteristic of the present invention, the electrolyte in contact with the negative electrode is essentially contained in the porosity of the negative electrode and the second separator holding a volume of electrolyte of between 2 and 3 $cm^3$ per $dm^2$ of frontal surface.

The electrolyte in contact with the negative electrode is composed for example of an aqueous solution of KOH in an initial concentration of between 4 and 8 M in which has been dissolved between 70 and 100 g of aluminium, or in a concentration of between 3 and 4 M.

This solution of KOH in a concentration of between 3 and 4 M may comprise moreover a zinc sequestering agent, for example a lignosulphonate or stannates in a concentration of between 0.01 and 0.1 M.

According to one characteristic, the positive electrode is an Ni or Ag electrode.

According to this characteristic, the electrolyte in contact with the positive electrode is essentially contained in the porosity of the positive electrode and the first separator holding a volume of electrolyte of between 3 and 8 $cm^3$ per $dm^2$ of apparent surface.

The electrolyte in contact with the positive electrode is for example composed of a solution of KOH in a concentration of between 4 and 8 M, and may comprise moreover 1 M in LiOH.

The membrane has a given anionic conductivity for example of at least 90% of the through-current of $OH^-$ anions.

It is for example based on polyoxyethylene or polyoxymethylene modified by exchange groupings of the quaternary ammonium type.

According to one characteristic, the membrane is provided, in one free part, with at least one means allowing the passage of gases released by the electrodes between the first and second compartments.

According to another characteristic, the storage battery comprises respective first and second reserves of electrolyte at the bottoms of the first and second compartments; the storage battery being in a vertical position in use.

Finally, the positive electrode may also be an electrode porous to gas, fed by oxygen or air.

Other characteristics and advantages of the present invention appear more clearly on reading the description that follows made with reference to the accompanying drawings in which.

In these figures, equivalent elements are designated by the same reference numerals.

Figure 1:
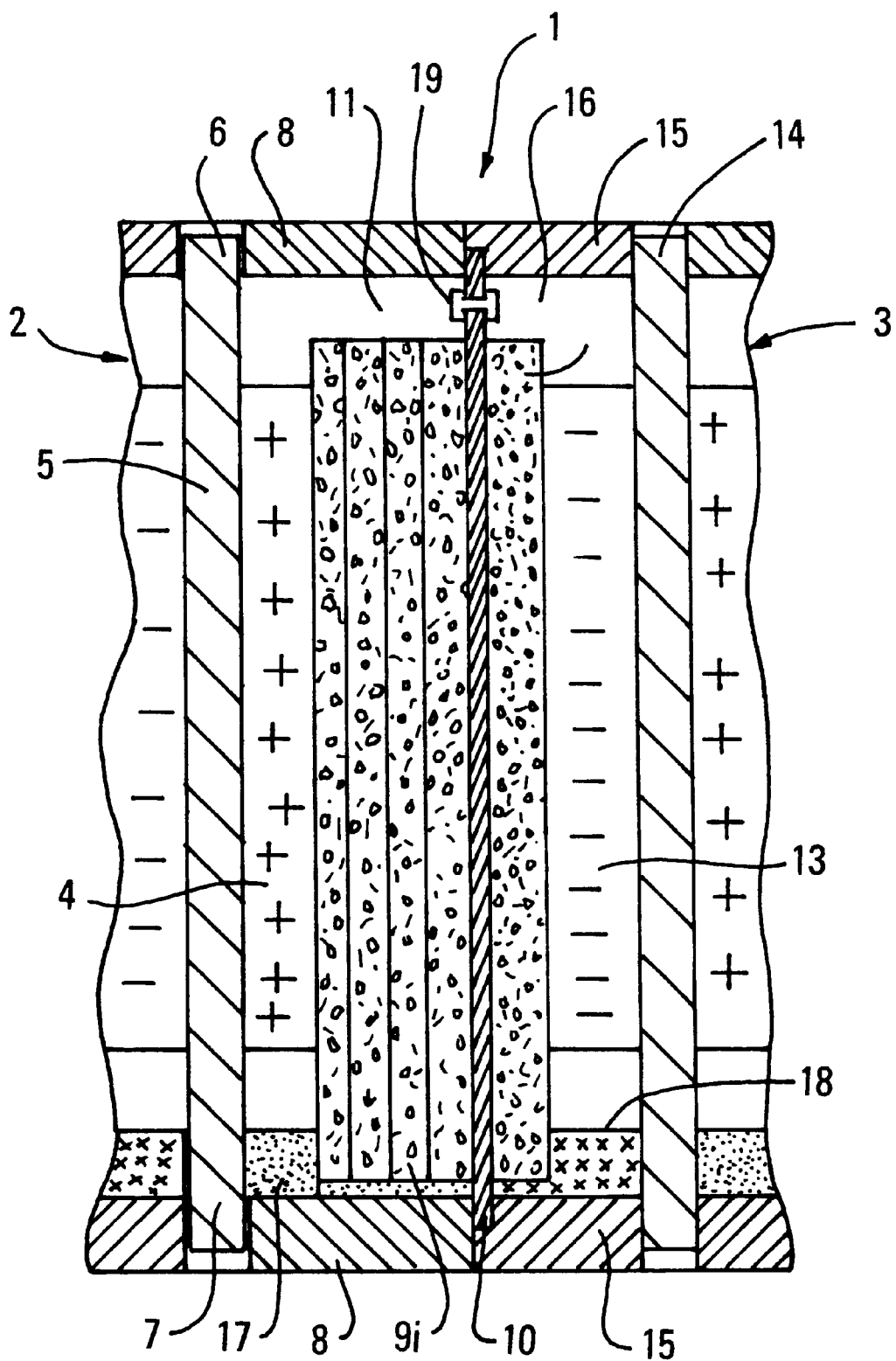
FIG. 1 is a partial cross section of a characteristic module of a stack of bipolar electrodes of a storage battery according to the invention.

One advantage of the present invention is the improvement in the behaviour of the positive nickel electrode during its cycling.

The composition of the zinc electrode uses a formulation that is already well known.

The active mass is made up of active material ZnO, of $Ca(OH)_2$, of an additive limiting the auto-discharge of the zinc or on charging the release of hydrogen, such as CdO, $SnO_2$, $PbO_2$, fibrillation paste binders (such as PTFE, abbreviation for polytetrafluoroethylene) and partial gellification (carboxy-methylcellulose).

The active mass is formed into a paste on a collector of the nickel or copper foam type, previously coated with zinc or cadmium or lead, about one third of the active mass being impregnated with this foam, the other two thirds being on the surface.

It is advantageous, for the collection of charges, to employ frontal drainage and to effect the recombination of the oxygen on the negative electrode by the face of the electrode in contact with the separator, the whole being part of a bipolar architecture.

The present invention uses two separate electrolytes, one in contact with the positive electrode, the other with the negative electrode; their separation being ensured by a membrane, in particular an ion exchange membrane.

With regard to the electrolyte in contact with the negative electrode, its volume may with advantage be low and more precisely slighter greater than the volume of electrolyte needed to fully dampen the entire porosity of the negative electrode.

Thus, for an electrode whose thickness is of the order of 1 mm, it is generally observed that the volume needed to dampen it is close to 5 cm$^3$ per dm$^2$ of electrode.

In order to avoid troublesome drying phenomena of the negative electrode, this volume may be increased by a supplementary reserve of electrolyte of 2 to 3 cm$^3$ per dm$^2$ of active surface, corresponding to the dampening of a fibrous separator, for example a separator marketed under the registered trade mark Viledon FS 2119 by the company, Carl Freudenberg. Its thickness after assembly (and hence compression) is of the order of 0.15 mm.

In the case of the use of the separator given as an example, the reserve of electrolyte is obtained by stacking one or two layers of the said separator.

In the case of the use of two layers of separators, for a volume of electrolyte of the order of 7 cm$^3$ per dm$^2$ of an electrode whose effective capacity is close to 5 Ah/dm$^2$, the quantity of zinc made soluble being of the order of 6 g, it is evident that that majority of the Zn$^{2+}$ is in the form of an oxide or hydroxide and not of zincates.

However, even in this low volume of electrolyte, the concentration of zincates may become raised for a very alkaline electrolyte such as a solution of KOH in a concentration of 6 to 8 M.

In order to reduce this solubility, 70 to 100 g of aluminium is dissolved in a solution, which is therefore made soluble in the form of aluminates. It is noted that this addition severely limits the solubility of the zinc in the form of zincates.

Another means according to the invention of reducing the solubility of the zinc consists in using a less concentrated solution of KOH, for example between 3 and 4 M, without dissolving aluminates in it. On the other hand, it is advantageous to dissolve stannates in a concentration of between 0.01 and 0.1 M in this solution. It is also advantageous to dissolve a small quantity of a zinc sequestering agent, such as potassium lignosulphonate in this solution.

The zinc complexed by the above-mentioned compound is then presented in the form of an ion of greater volume than the zincate ion thus reducing its passage through the anionic membrane.

With regard to the membrane, good results have been obtained with an anionically conductive membrane.

The present invention is not confined to a membrane allowing the exchange of ions and may be extended to other membranes allowing the passage of OH$^-$ substances, and constituting an effective zincate and optionally aluminate filter.

Indeed although the solubility of the zincates in the electrolyte may be weakened, it is never completely eliminated and, in these conditions, it is appropriate to avoid the transmission of zincate ions in the electrolyte where the positive electrode is immersed.

Moreover, it is observed that the presence of a high concentration of aluminates in the electrolyte (greater for example than 80 g/dm$^3$ expressed in aluminium) reduces, as for the zincates, the restorable capacity of the positive electrode.

The membrane must therefore prevent as far as possible the passage of zincate and aluminate anions; it is advantageous to use a membrane with an anionic conductivity ensured by the OH$^-$ anions for at least 90% of the through-current.

Satisfactory results have been obtained with membranes based on polyoxyethylene or polyoxymethylene modified by exchange groupings of the quaternary ammonium type.

Thus, according to the present invention, it is not required that the membrane, as is the case for all other embodiments published up to the present, should impede the progress of the zinc dendrites, but that it should essentially protect the positive nickel electrode.

However, since a membrane is never completely selective, in spite of its use, the presence of zincates and possibly aluminates can be observed in the electrolyte in which the positive electrode is placed.

In order to delay for as long as possible the moment when the concentration in zincate or aluminate anions becomes troublesome for the nickel electrode, it is advantageous to have available a surplus volume of electrolyte in the compartment where the positive electrode is located.

Thus, besides the volume of electrolyte necessary for dampening the porosity of the positive electrode, a reserve is available constituted by the impregnation by the electrolyte of high porosity separators, for example fibrous, that are clamped between the positive electrode and the ion exchange membrane.

However, this mass of electrolyte should not be too great, at the risk of greatly reducing the mass characteristics of the generator and/or of causing crippling drops in resistance when operating at high current densities.

Thus, good results are obtained with three or four thicknesses of Viledon FS 2119 separator which allows retention of the order of 6 to 8 cm$^3$ of electrolyte per dm$^2$ of electrode.

In a particular embodiment of a storage battery according to the invention, the electrolyte in contact with the positive electrode is essentially contained in the porosity of the positive electrode and one or more separators holding a volume of electrolyte of between 3 and 8 cm$^3$ per dm$^2$ of apparent surface.

In addition, to ensure the proper functioning of the nickel electrode, the electrolyte used is a solution of KOH in a concentration of between 4 and 8 M. It is also possible, as is the general practice, to use a solution of KOH comprising 1 M in LiOH.

FIG. 1 illustrates, by way of non-restrictive example, a module 1 characteristic of a stack of bipolar electrodes 2 and 3 of a storage battery according to the invention whose detailed description is given below together with the characteristics of each component.

This description is made from left to right on FIG. 1.

A positive electrode 4 is fixed to the internal face of bipolar screen 5 of the first bipolar electrode 2.

Electrode 4 is constituted by a nickel foam made into a paste by an active mass whose composition is:

active material: spherical Ni(OH)$_2$, of density 2, containing 3% Co and 6% Cd;
additive: CoO, nickel powder;
binder PTFE (abbreviation for polytetrafluoroethylene).

Its capacity per unit of area, in free electrolyte, is 4 Ah/dm$^2$ measured by discharge at a rate of 0.2 C.

Its thickness is 1 mm. The volume of electrolyte impregnating it is 4.5 cm$^3$/dm$^2$. Current collection is effected by pressure of the electrode 4 on the bipolar screen 5.

The bipolar screen 5 is supported by its ends 6 and 7 in the frame 8 ensuring the sealing of module 1.

On the face of the positive electrode 4, opposed to the face in contact with the bipolar screen 5, are arranged four Viledon FS 2119 separators 9$i$ impregnated with electrolyte. The electrolyte is a solution of KOH in a concentration of 7.5 M. The apparent surface of the separators 9$i$ is such that they project 2 mm in relation to the two vertical sides of the positive electrode 4. On the other hand this projection is 5 mm in relation to the lower end of the positive electrode.

On the separators 9$i$ is arranged an ion exchange membrane 10, marketed under the registered trade mark Neosepta AMH by the Tokuyama Soda company, of which three sides (two vertical sides+one lower side) project in relation to those of the separators 9$i$ in such a way that, on a band 5 mm wide, the membrane 10 is pressed on three of the above-mentioned sides against the sealing frame 8.

The space between the bipolar screen 5 and the membrane 10 defines the positive compartment 11.

On the other side of the membrane 10 is arranged a Viledon FS 2119 separator 12 impregnated with electrolyte. This electrolyte is a solution of KOH in a concentration of 8 M in which has been dissolved 80 g of aluminium/dm$^3$. Its dimensions are the same as those of the separators 9$i$ arranged at the side of the positive electrode 4.

A negative electrode 13 is pasted on a nickel or copper foam with added cadmium or lead having an initial thickness of 2 mm. The face of the negative electrode 13, opposite the face in contact with the separator 12, is pressed against the bipolar screen 14 of the second bipolar electrode 3.

The edges of the bipolar screen 14 are supported by a second frame 15 ensuring the sealing of the module 1 and the pinching of the membrane 10 against the first frame 8.

The space between the bipolar screen 14 and the membrane 10 defines a negative compartment 16.

The active mass of negative electrode 13 is composed of:
Active material: ZnO 75%;
Additive: CdO between 2 and 12%;
a binder comprising 10% carboxymethylcellulose and 3% PTFE.

The electrode 13 is dampened by the electrolyte described previously (a solution of KOH in a concentration of 8 M comprising in the dissolved state 80 g/dm$^3$ of aluminium).

The apparent surface area of the electrode is 1 dm$^2$ and has the same dimensions as the positive electrode 4. Its discharge at 0.2 C shows that the restored capacity is 6 Ah.

The bipolar screens 5 and 14 respective to the bipolar electrodes 2 and 3 are constituted for example of a polymer rendered electronically conductive by a carbon charge.

The screens 5 and 14 have a thickness of 0.2 mm. They are coated with nickel on their face in contact respectively with the positive electrode 4, and on their other face respectively in contact with the negative electrode 13, they are coated with nickel then with cadmium.

In the embodiment in FIG. 1, a vertically arranged storage battery is shown.

This arrangement allows respective reserves of electrolytes 17 and 18 to be provided at the bottom of the positive and negative compartments 11 and 16.

Being concerned with maintenance-free storage batteries, it is nevertheless appropriate that the oxygen formed during the overload of positive electrode 4 can be recombined with rapid kinetics with the negative electrode 13.

Similarly, releases, even if minimal, of hydrogen on the negative electrode 13 are not very troublesome if this hydrogen can be recombined on the positive electrode 4.

Now an ion exchange membrane 10 whose sealing has been effected over all its perimeter unfortunately no longer allows the passage of gases from one compartment to the other.

Solutions to remedy this problem have already been proposed, such as the use of a membrane where hydrophobic areas (allowing the passage of gases) coexist with hydrophilic areas (where the passage of ions occurs). Such a component is difficult to achieve and there is reason to fear that the boundary regions between the two areas do not play the expected role of barring all transfer of electrolyte.

Another solution consists in creating channels in the sealing frame that allow the passage of gases to the exterior of the membrane. Such a device is difficult to achieve and weakens the sealing frames.

Figure 2:
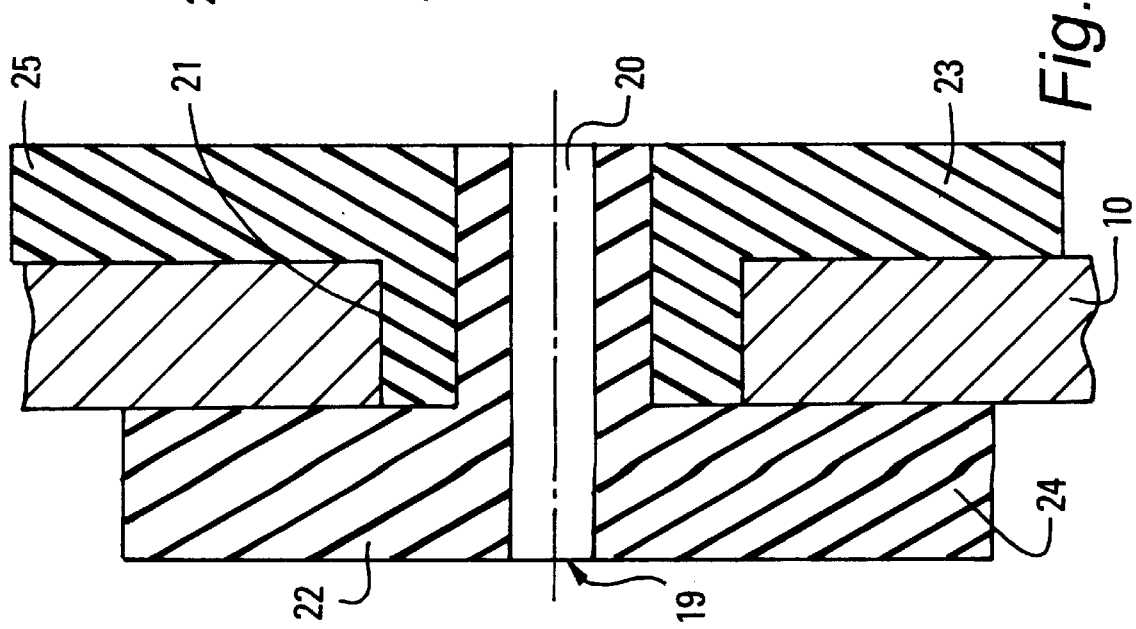
FIG. 2 shows a first embodiment of a means of passage of gases between two compartments of a storage battery according to the invention, containing two different respective electrolytes.

FIG. 2 illustrates a first means 19 according to the invention that allows the passage of gases while correcting the drawbacks mentioned above.

This means of passage 19 is also shown symbolically in FIG. 1.

An orifice 20 is arranged in the ion exchange membrane having a thickness of between 0.1 and 0.5 mm, in an area where it is not in contact with separators 9$i$, 12 or electrodes 4, 13, soaked with electrolyte, in other words in a marginal area close to the sealing area.

In order to avoid the risk of passage of electrolyte through orifice 20, the orifice has a diameter of between 1 and 5 mm and its walls have a markedly hydrophobic characteristic.

To obtain this characteristic, the membrane 10 is pierced from one side to the other by a hole 21 of predetermined diameter to allow the assembly of a first PTFE sleeve 22 force fitted into a second sleeve 23.

The internal diameter of the hole 21 pierced in the membrane 10 corresponds to the external diameter of the second sleeve 23 and the internal diameter of the first sleeve 22 corresponds to the diameter of the orifice 20.

The two sleeves 22 and 23 comprise respectively two pressed flanges 24 and 25 which after fitting the two sleeves 22 and 23 pinch the membrane 10.

The thickness of the pressed flanges 24 and 25 is less than 0.8 mm.

The number of these passages 19 per element is in proportion to the capacity (Ah) of the element, therefore, among others, to the dimensions and operating conditions applied in particular during overloads (intensity and duration).

Several embodiments of a means of ensuring both the passage of the gas and at the same time the hydrophobic characteristic of this means, may be adopted.

Figure 3:
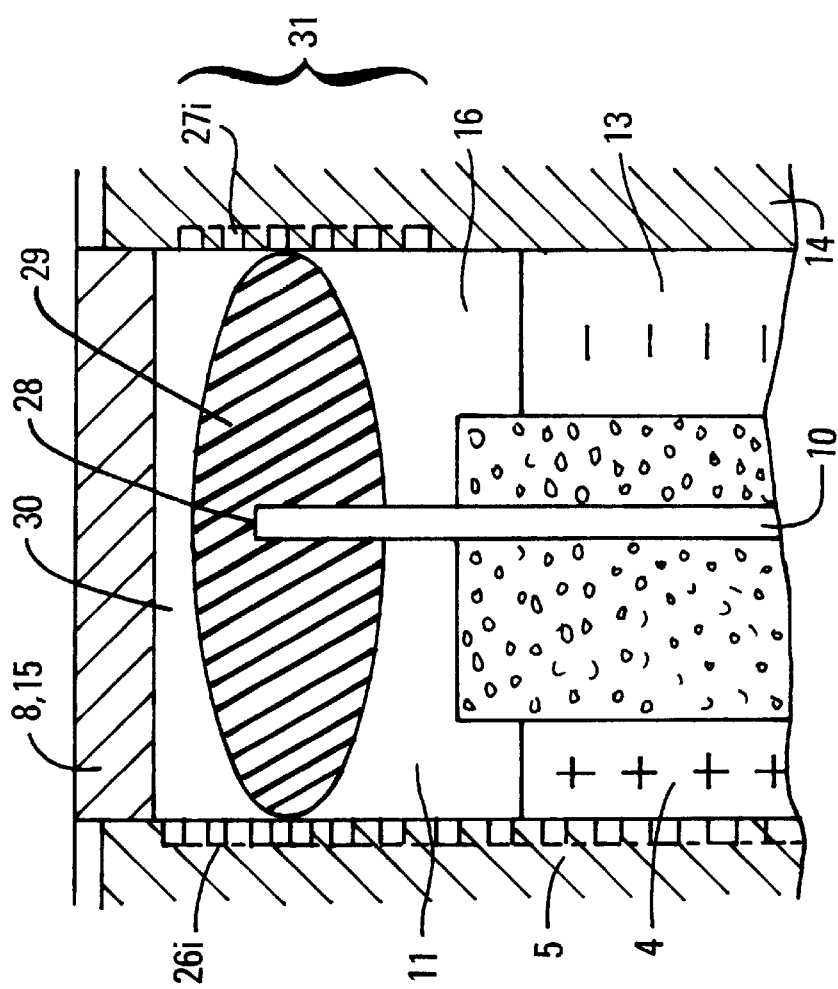
FIG. 3 shows a second embodiment of a means of passage of gases between two compartments of a storage battery according to the invention, containing two different respective electrolytes.

According to a second means illustrated in FIG. 3 allowing the passage of gases from the positive compartment 11 to the negative compartment 16 or vice versa, grooves 26$i$, 27$i$ are arranged on the internal faces of the bipolar screens 5, 14 and extend beyond the surface occupied by ion exchange membrane 10.

With regard to its face in contact with the positive electrode 4, the screen 5 is grooved in two directions for example perpendicular over its entire surface apart from the marginal areas serving to effect a seal by frame 8.

One end of the membrane 10 is not connected to the frame 8, 15 and is said to be free. This free end 28 is opposite grooves 26$i$ and 27$i$ arranged respectively in the bipolar screens 5 and 14.

An elastomer 29 is moulded over the free end 28 of the membrane 10 and extends between the two bipolar screens 5 and 14 on both sides of the free end 28 of the membrane 10.

The elastomer 29 closes the first and second compartments 11 and 16 and defines an intermediate space 30 between the exterior sealing frame 8, 15 and the internal faces of the bipolar screens 5 and 14.

The oxygen may therefore be transported via intermediate space 30, delimited by the sealing frame 8, 15, the bipolar grooved screens 5 and 14, from one compartment 11 to the other 16.

On the other hand, the bipolar screen 14, with regard to its face that is not in contact with zinc electrode 13, comprises grooves 27$i$ only in an area 31 extending roughly between frame 8, 15 and zinc electrode 13. The grooves may extend in one or more directions, thus permitting the passage of gases from the intermediate area 30 to the zinc electrode 13 via the preceding area 31 or the other way round.

The gas passage 19 is therefore defined by the grooves 26$i$ and 27$i$ and by the intermediate space 30.

What is claimed is:

1. A storage battery, comprising at least one positive electrode and a negative zinc electrode in contact with an electrolyte via at least one electrolyte-impregnated separator, clamped against two respective bipolar screens supported by a sealing frame; wherein the positive electrode is in contact with a first electrolyte having a predetermined volume and composition via at least one first separator, wherein the negative electrode is in contact with a second electrolyte having a predetermined volume and composition different from those of the first electrolyte via at least one second separator, wherein the first and second electrolytes are separated by a membrane forming a zincate and optionally aluminate filter, said membrane defining a positive compartment and a negative compartment; wherein said membrane has a given anionic conductivity for at least 90% of the through-current of $OH^-$ anions, and wherein said membrane is based on polyoxyethylene or polyoxymethylene modified by exchange groupings of the quarternary ammonium type.

2. The storage battery according to claim 1, wherein the membrane is provided, in a free part, with at least one device allowing the passage of gases released by the electrodes between the positive and negative compartments.

3. The storage battery according to claim 2, wherein the device allowing the passage of gases released by the electrodes between the positive and negative compartments comprises a hydrophobic orifice formed by a first and second sleeve force fitted one inside the other on both sides of the membrane; the diameter of the hole in the interior sleeve defining the diameter of the orifice.

4. The storage battery according to claim 2, wherein the device allowing the passage of gases released by the electrodes between the positive and negative compartments comprises grooves arranged respectively on the faces of the bipolar screens on which are supported the electrodes, and a polymer fixed at an end of the membrane which is not connected to the frame, closing the positive and negative compartments and defining an intermediate space between the external sealing frame and the bipolar screens; the passage between the positive and negative compartments being defined by the grooves and the intermediate space.

5. A storage battery, comprising at least one positive electrode and a negative zinc electrode in contact with an electrolyte via at least one electrolyte-impregnated separator, clamped against two respective bipolar screens supported by a sealing frame; wherein the positive electrode is in contact with a first electrolyte having a predetermined volume and composition via at least one first separator, wherein the negative electrode is in contact with a second electrolyte having a predetermined volume and composition different from those of the first electrolyte via at least one second separator, wherein the first and second electrolytes are separated by a membrane forming a zincate and optionally aluminate filter, said membrane defining a positive compartment and a negative compartment; wherein the positive electrode is an electrode of Ni or of Ag, and wherein the membrane is provided, in a free part, with at least one device allowing the passage of gases released by the electrodes between the positive and negative compartments.

6. The storage battery according to claim 5, wherein the device allowing the passage of gases released by the electrodes between the positive and negative compartments comprises a hydrophobic orifice formed by a first and second sleeve force fitted one inside the other on both sides of the membrane; the diameter of the hole in the interior sleeve defining the diameter of the orifice.

7. The storage battery according to claim 5, wherein the device allowing the passage of gases released by the electrodes between the positive and negative compartments comprises grooves arranged respectively on the faces of the bipolar screens on which are supported the electrodes, and a polymer fixed at an end of the membrane which is not connected to the frame, closing the positive and negative compartments and defining an intermediate space between the external sealing frame and the bipolar screens; the passage between the positive and negative compartments being defined by the grooves and the intermediate space.

* * * * *